United States Patent Office 3,810,940
Patented May 14, 1974

3,810,940
PROCESS FOR PRODUCING ACID CHLORIDES
Charles Frank Hauser, Charleston, W. Va., assignor to Union Carbide Corporation, New York, N.Y.
No Drawing. Filed Apr. 7, 1972, Ser. No. 242,176
Int. Cl. C07c 51/58, 63/22, 63/30
U.S. Cl. 260—544 M                   5 Claims

ABSTRACT OF THE DISCLOSURE

Acid chlorides are produced by the reaction of intramolecular anhydrides of carboxylic acids with phosgene using a carboxamide compound as the catalyst in the presence of an inert organic aromatic solvent.

BACKGROUND OF THE INVENTION

The production of carboxylic acid chlorides by the reaction of an intermolecular anhydride of carboxylic acids with phosgene is known and is disclosed in U.S. 3,318,950. This patent, however, states in Examples VIII and IX that their disclosed process is not operable for the conversion of an intramolecular anhydride such as succinic anhydride or phthalic anhydride to the corresponding carboxylic acid chloride. This failure to produce carboxylic acid chlorides from intramolecular anhydrides has necessitated the use of expensive processes for the products and has therefore limited their availability and use.

DESCRIPTION OF THE INVENTION

It has now been found that carboxylic acid chlorides can be produced by the catalyzed reaction of intramolecular anhydrides of carboxylic acid, or cyclic ring anhydrides, with phosgene in the presence of an inert aromatic organic solvent. The fact that the carboxylic acid anhydrides could be produced from intramolecular anhydrides was a completely unobvious and unexpected finding.

In the process of this invention a cyclic ring anhydride, or intramolecular anhydride, is reacted with phosgene in the presence of a carboxamide catalyst and an inert aromatic organic solvent at an elevated temperature up to the boiling point of the reaction mixture.

The intramolecular anhydrides are the anhydrides of dicarboxylic acids formed by the dehydration of two carboxylic groups in the same molecule. Thus, intramolecular anhydrides require the dehydration of only one molecule of the carboxylic acid starting material. The intramolecular anhydrides differ from the intermolecular anhydrides in that in the intermolecular anhydrides the anhydride oxygen atom is part of an open chain whereas in the intramolecular anhydrides the anhydride oxygen atom is part of a cyclic ring. Further, two molecules of the carboxylic acid are required to form an intermolecular anhydride whereas cyclic ring anhydrides or intramolecular anhydrides are produced by the dehydration of a single molecule of a dicarboxylic acid.

The intramolecular anhydrides, or cyclic ring anhydrides, are characterized by the presence in the molecule of the cyclic anhydride group

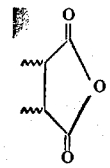

In this structure the wavy lines represent the balance of the anhydride molecule, for example, in phthalic anhydride it forms the phenyl ring. Any unsubstituted or substituted intramolecular anhydride can be used in the process of this invention and illustrative thereof one can mention trimellitic anhydride, tetrahydrophthalic anhydride, phthalic anhydride, succinic anhydride, naphthoic anhydride, glutaric anhydride, or any other intramolecular anhydride including those having substituents thereon such as halogen atoms, alkyl or alkoxy groups, nitro, carboxyl, aryl, or any other group which will not unduly interfere with the reaction involving the formation of the acid chloride group.

The carboxamide catalysts suitable for use in the process of this invention are those represented by the formula:

wherein R is hydrogen or a lower alkyl group preferably having from 1 to 4 carbon atoms and R' is a lower alkyl group preferably having from 1 to 4 carbon atoms and in which the two R' groups can be the same or different from each other. Compounds wherein R or R' contain more than 4 carbon atoms can also be used. Among the suitable carboxamides one can mention N,N-dimethylformamide, N,N-dimethylacetamide, N,N-di-n-propylacetamide, N,N-diisopropylacetamide, N,N-dibutylformamide, N,N-diethylpropionamide, N,N-dimethylbutyramide, N-methylformanilide, N-methylacetanilide. These are merely illustrative and not limitative of those that can be used.

The concentration of the carboxamide catalysts in the reaction mixture can vary from about 0.05 to about 10 weight percent based on the cyclic ring anhydride. The preferred concentration is from about 0.1 to 1 weight percent on the same basis. Any catalytic amount sufficient to catalyze the reaction can be used.

The inert aromatic organic solvent can be any aromatic solvent which does not interfere with the principal reaction between the cyclic ring anhydride and phosgene. It can be benzenoid in character or it can have a naphthyl or anthracyl structure. The compound can be substituted, but the substituents must not interfere with the principal reaction, which is the formation of the acid chloride group. Illustrative of suitable inert aromatic organic solvents one can mention benzene, toluene, xylene, ethylbenzene, chlorobenzene, dichlorobenzene, chloromethylbenzene, bromobenzene, naphthalene, methylnaphthalene, anthracene, biphenylene, nitrobenzene, decabromobiphenyl, and the like.

As previously indicated the reaction can be carried out at an elevated temperature up to the boiling point of the reaction mixture. Thus, the temperature can vary from 25° C. to 200° C. or higher. The preferred reaction temperature is from about 60° C. to about 110° C. As is recognized, at the lower temperatures the reaction can be at too slow a rate for commercial practice and at the higher temperatures there may be some loss due to evaporation unless suitable precautions are taken. The reaction can be carried out at atmospheric, subatmospheric, or superatmospheric pressure and pressure is not critical for the satisfactory conductance of the process of this invention.

The process requires one molecule of phosgene with each molecule of cyclic ring anhydride but a larger amount can of course be used and a small excess is generally employed. In the process of this invention the phosgene is bubbled through the catalyzed reaction mixture while the mixture is being stirred and heated. Volatile products are condensed and recycled if they can be used in the reaction, for example, unreacted phosgene that may have volatilized from the reaction mixture, or they are vented to the atmosphere, for example, the carbon dioxide formed during the reaction.

It was found that those aromatic cyclic ring anhydrides containing substituents on the aromatic ring other than the cyclic ring anhydride group are converted to the carboxylic acid chloride derivaties in essentially quantitative yields. Those compounds not having the substituent on the aromatic ring are converted in high yields but generally not to essentially complete conversion. It was also observed that the aromatic solvents improved the conversion of intermolecular anhydride to the corresponding carboxylic acid chlorides and benzoyl chloride of excellent purity was produced at an efficiency of 98.3 percent using o-dichlorobenzene as the solvent, whereas it was produced at an efficiency of only 54.4 percent when using n-hexane as the solvent following the procedure described in U.S. 3,318,950.

The following examples further serve to illustrate this invention.

EXAMPLE I

To a three-necked, one-liter, round-bottomed flask equipped with a stirrer, a gas inlet tube, a thermometer and a Dry Ice deflamator there were added 192 grams of trimellitic anhydride, 200 grams of chlorobenzene and 0.73 grams of dimethylformamide. The reaction mixture was heated to 68° and phosgene was sparged through the mixture over a period of five hours while it was continually stirred at a temperature of 68 to 77° C. This addition of phosgene was conducted until there was no further evidence of evolution of off gases. The chlorobenzene was removed by vacuum distillation and 1,2,4-trichlorocarbonylbenzene was collected by distillation at a pressure 1.5 to 1.8 mm. mercury and a temperature of 144 to 147° C. The 1,2,4-trichlorocarbonylbenzene was obtained in excellent purity at an efficiency of 94.8 percent.

EXAMPLE II

In the manner described in Example I, a mixture of 192 grams of trimellitic anhydride, 200 grams of chlorobenzene and 0.37 grams of dimethylformamide were reacted with phosgene at a temperature of 58 to 78° C. over a period of six hours. A total of 2.4 moles of phosgene was added per molecule of the cyclic acid anhydride. 1,2,4-trichlorocarbonylbenzene was produced and recovered at an efficiency of 98.4 percent.

EXAMPLE III

In the manner described in Example I, 304 grams of tetrahydrophthalic anhydride, 300 grams of chlorobenbene and 1.46 grams of dimethylformamide were reacted with phosgene at 52 to 75° C. over a period of five hours. During this time 1.1 moles of phosgene were added per mole of the cyclic ring anhydride charged. Tetrahydrophthaloyl chloride was produced and recovered at an efficiency of 73.9 percent. The major by-product produced was 1 (or 2)-carbonyl chlorocarbonyl - 5,6 - dihydrobenzene.

EXAMPLE IV

In a manner similar to that described in Example I, a mixture of 224 grams of phthalic anhydride, 306 grams of chlorobenzene and 1.46 grams of dimethylformamide was reacted with phosgene at 69 to 80° C. over a period of five hours. During this time 1.1 moles of phosgene were added per mole of the cyclic acid anhydride charged. 1,2-dichlorocarbonylbenzene was produced and recovered at an efficiency of 71.6 percent.

For comparative purposes the above experiment was repeated using n-hexane as the solvent and introducing 2.8 moles of phosgene per mole of cyclic aromatic anhydride following the procedure described in U.S. 3,318,-950. Over the five-hour period during which the experiment was carried out there was no reaction observed and at the conclusion of the experiment the phthalic anhydride charged was recovered unchanged.

EXAMPLE V

In a manner similar to that described in Example I, a mixture of 200 grams of succinic anhydride, 400 grams of chlorobenzene and 1.46 grams of dimethylformamide was reacted with phosgene at 70 to 76° C. for three hours. During this period 1.2 moles of phosgene were added per mole of the cyclic ring anhydride. Succinoyl chloride of excellent purity was produced and recovered at an efficiency of 90.7 percent.

For comparative purposes the above reaction was repeated using n-heptane as the solvent and 1.7 molecules of phosgene were added per molecule of cyclic ring anhydride following the procedure described in U.S. Pat. 3,318,950. After a reaction period of 1.5 hours at 85° C. impure succinoyl chloride was produced at an efficiency of only 21 percent.

What is claimed is:

1. A process for producing carboxylic acid chlorides which comprises reacting an intramolecular anhydride of a carboxylic acid with phosgene in contact with a catalytic amount of dimethylformamide at a temperature of 25° C. to 200° C. in the presence of chlorobenzene.

2. A process as claimed in 1 wherein trimellitic anhydride reacts to produce 1,2,4-trichlorocarboxylbenzene.

3. A process as claimed in claim 1 wherein tetrahydrophthalic acid reacts to produce tetrahydrophthaloyl chloride.

4. A process as claimed in claim 1 wherein phthalic anhydride reacts to produce phthaloyl chloride.

5. A process as claimed in claim 1 wherein succinic anhydride reacts to produce succinoyl chloride.

References Cited

UNITED STATES PATENTS

| | | | |
|---|---|---|---|
| 3,222,397 | 12/1965 | Talaty | 260—544 Y |
| 3,318,950 | 5/1967 | Christoph et al. | 260—544 Y |

LORRAINE A. WEINBERGER, Primary Examiner

R. D. KELLY, Assistant Examiner

U.S. Cl. X.R.

260—544 L, 544 Y